United States Patent [19]
Butti et al.

[11] 3,907,992
[45] Sept. 23, 1975

[54] PHARMACEUTICAL COMPOSITIONS CONTAINING SALTS OF SULFOGLYCOPEPTIDES WITH AMINOACIDS

[75] Inventors: Adriano Butti, Como; Giuseppe Prino, Milan, both of Italy

[73] Assignee: Crinos Industria Farmacobiologica S.p.A., Villa Guardia, Italy

[22] Filed: Oct. 10, 1973

[21] Appl. No.: 405,178

[30] Foreign Application Priority Data
Oct. 18, 1972 Italy.................................. 30582/72

[52] U.S. Cl.................................. 424/177; 260/112
[51] Int. Cl.².......................................... A61K 27/00
[58] Field of Search.................................... 424/177

Primary Examiner—Elbert L. Roberts
Attorney, Agent, or Firm—Browdy and Neimark

[57] ABSTRACT

Composition of matter consisting of anti-inflammatory pharmaceutical formulations, such as capsules, tablets and the like, containing as active agents the salts obtained by reaction of sulphated glycopeptides with aminoacids.

12 Claims, No Drawings

PHARMACEUTICAL COMPOSITIONS CONTAINING SALTS OF SULFOGLYCOPEPTIDES WITH AMINOACIDS

BACKGROUND OF THE INVENTION

This invention relates to compositions of matter useful as medicine essentially consisting of salts obtained by reaction of sulphated glycopeptides with aminoacids.

There are known salts of polysulfuric esters of glycopeptides (sulfoglycopeptides) with alkali, alkaline earth and heavy metals which have anti-inflammatory properties. To be used in therapy, said salts however require particular treatments after they are obtained, or particular application precautions suited to reduce the toxicity thereof. This is particularly applicable to salts derived from heavy metals of alkaline earth metals such as barium, which generally have a higher or lower toxicity degree.

SUMMARY OF THE INVENTION

It has now been found, and is the object of this invention, that certain compositions containing as active agents the salts of sulfoglycopeptides with natural or synthetic aminoacids are practically free from any toxic activity and have an anti-inflammatory activity higher than that of the already known sulfoglycopeptides salts.

The anti-inflammatory compositions of the present invention may be obtained, according to a preferred method described in our copending Application No. 405,179 filed on Oct. 10, 1973, starting from the sulfoglycopeptides disclosed in U.S. Pat. No. 3,518,243 to A. Butti et al.

This patent states in column 1 under the heading "Summary of the Invention" that there is provided a process for preparing a sulfonated product of a glycopeptide obtained from the gastric mucosa or duodenum of swine. The process comprises hydrolyzing the animal organ in water, removing acidic hydrolysis byproducts, diluting the remaining and desired product with a non-solvent therefore, suspending the diluted product in a heteroclyclic tertiary base, contacting the resulting suspension with a sulfonating agent, and recovering the resulting sulfonated product.

DESCRIPTION OF THE PREFERRED EMBODIMENT

The pharmaceutical composition of the present invention consists essentially of an effective amount of a sulfoglycopeptide salt the anion of which is the same as the sulfoglycopeptide salt disclosed in the above mentioned U.S. Pat. No. 3,518,243, and the cation of which is a natural or synthetic nitrogen-containing organic compound, more preferably an $\alpha$-amino acid such as glutamine or histidine, or nicotinamide.

As mentioned in the copending application Ser. No. 405,179, the $\alpha$-amino acid may be selected from the group consisting of glutamine, methionine, histidine, lysine, asparagine, arginine, cysteine, proline, serine, threonine and tryptophane.

The salts of said sulfoglycopeptides with natural or synthetic amino-acids exercise a considerable anti-inflammatory pharmacological action and appear particularly useful as medicine in treating both stomach and duodenum ulcerous phenomena. Actually, in the tests conducted on experimental animals, they showed the following pharmacological properties:

a. reduction of ulcer due to ligature of pylorus and to hydrocortisone and histamine at a dose of 10–20 mg/kg endoperitoneally and 50–100 mg/kg orally;
b. inhibition of peptic activity of gastric juice both "in vivo" (50 mg/kg orally) and "in vitro" (100 $\mu$g/ml);
c. increase in cicatrization velocity of chronical experimental ulcers at a dose of about 100 mg/kg/day, orally;
d. inhibition of local oedema in rats due to carragheenin, serotonin and kaolin, at a dose of 3–5 mg/kg, parenterally;
e. inhibition of hypersecretion induced in rats with histamine, gastrine and betanechol (carbinoyl-beta-methylcholine) at a dose of 1 mg/kg, intravenously.

No toxic phenomena were observed either in rats or mice after a single treatment with 3000 mg/kg, orally.

The antiphlogistic properties according to the present invention were tested for three of the possible active compounds prepared by the process disclosed in our aforesaid copending Application, namely for the salts of a sulfoglycopeptide (GLPS 59) with glutamine, histidine and nicotinamide respectively. (Though nicotinamide is not an aminoacid, it has been so considered here, because of its structural and chemical resemblance to the heterocyclic aminoacids such as, for instance, histidine and tryptophane.)

The test screening was conducted on rats having experimental ulcers due to the ligature of pylorus, following a latin square scheme of work with two operators, one rat per dose per operator, and five repetitions.

The obtained data are summarized in the following Table I as inhibition percentages each averaging five runs:

Table I

| Compound | No. of anim. | Dose mg/kg (orally) | Average | ±E.E. | Inhibition % |
|---|---|---|---|---|---|
| Distilled water | 10 | ml 10/kg | 4.00 | ±0.477 | — |
| GLPS 59 | 10 | 50 | 1.70 | ±0.727 | 27.50 |
|  | 10 | 100 | 1.25 | ±0.473 | 38.75 |
|  | 10 | 200 | 1.05 | ±0.368 | 70.75 |
| GLPS+ Nicotinamide | 10 | 50 | 3.10 | ±0.682 | 22.50 |
|  | 10 | 100 | 2.20 | ±0.688 | 45.00 |
|  | 10 | 200 | 0.35 | ±0.198 | 91.25 |
| GLPS+ Glutamine | 10 | 50 | 3.75 | ±0.638 | 11.76 |
|  | 10 | 100 | 2.60 | ±0.770 | 38.82 |
|  | 10 | 200 | 0.40 | ±0.208 | 90.59 |
| GLPS+ Histidine | 10 | 50 | 1.50 | ±0.641 | 64.71 |
|  | 10 | 100 | 1.00 | ±0.447 | 76.47 |
|  | 10 | 200 | 0.65 | ±0.248 | 84.71 |

E.E.=Experimental error.

From the above data it is evident that the compositions of the present invention show generally a higher pharmacological activity than GLPS alone.

For use in human beings the compositions of this invention were incorporated in pharmaceutical formulations such as, for instance, capsules containing:

| | | |
|---|---|---|
| GLPS — glutamine salt | mg. | 50,0 |
| Lactose | " | 126,4 |
| Aerosil* | " | 2,4 |

-Continued

| | | |
|---|---|---|
| Magnesium stearate | " | 1.2 |
| (*trade name of an impalpable silica) and tablets consisting of: | | |
| GLPS — glutamine salt | mg. | 50.0 |
| Avicel | " | 256.0 |
| Talc | " | 8.3 |
| Aerosil | " | 0.7 |

Whereas the present invention has been illustrated with reference to some particular compounds and formulations, it will be appreciated that various modifications and variations may be introduced by those skilled in the art without departing from the scope and gist of this application.

What we claim is:

1. A pharmaceutical composition for the treatment of gastro-duodenal diseases, comprising
   as active agent an anti-inflammatory effective non-toxic amount of a sulfoglycopeptide salt whose anion is that of the sulfoglycopeptide salt disclosed in the U.S. Pat. No. 3,518,243 and whose cation is a nitrogen-containing organic cation derived from an alpha-amino acid,
   and a pharmaceutical diluent.

2. The composition according to claim 1, wherein the said alpha-aminoacid is glutamine.

3. The composition according to claim 1, wherein the said alpha-aminoacid is histidine.

4. The composition of claim 1, where said α-amino acid is selected from the group consisting of glutamine, methionine, histidine, lysine, asparagine, arginine, cysteine, proline, serine, threonine and tryptophane.

5. A pharmaceutical composition in accordance with claim 1 wherein the sulfoglycopeptide salt disclosed in U.S. Pat. No. 3,518,243 is that salt obtained by hydrolyzing the gastric mucosa or duodenum of swine in water, removing acidic hydrolysis byproducts, diluting the remaining and desired product with a non-solvent therefore, suspending the diluted product in a heterocyclic tertiary base, contacting the resulting suspension with a sulfonating agent, and recovering the resulting sulfonated product.

6. A method of producing an anti-inflammatory effect in a patient in need of such therapy comprising:
   administering, in unit dosage form, to a patient in need of said therapy, an anti-inflammatory-effective non-toxic amount of a sulfoglycopeptide salt whose anion is that of the sulfoglycopeptide salt disclosed in the U.S. Pat. No. 3,518,243 and whose cation is a nitrogen-containing organic cation derived from an alpha-amino acid.

7. A method in accordance with claim 6 wherein the sulfoglycopeptide salt disclosed in the U.S. Pat. No. 3,518,243 is that sulfoglycopeptide salt obtained by hydrolyzing the gastric mucosa or duodenum of swine in water, removing acidic hydrolysis byproducts, diluting the remaining and desired product with a non-solvent therefore, suspending the diluted product in a heterocyclic tertiary base, contacting the resulting suspension with a sulfonating agent, and recovering the resulting sulfonated product.

8. A method in accordance with claim 6 comprising orally administering said composition at a dosage of 50–100 mg. of said sulfoglycopeptide salt per kg. of body weight.

9. A method in accordance with claim 6 comprising endoperitoneally administering said composition at a dosage of 10 – 20 mg. of said sulfoglycopeptide salt per kg. of body weight.

10. A method in accordance with claim 6 comprising orally administering said composition at a dosage of about 100 mg. of said sulfoglycopeptide salt per kg. of body weight per day.

11. A method in accordance with claim 6 comprising parenterally administering said composition at a dosage of 3–5 mg. of said sulfoglycopeptide salt per kg. of body weight.

12. A method in accordance with claim 6 comprising intravenously administering said composition at a dosage of about 1 mg. of said sulfoglycopeptide salt per kg. of body weight.

* * * * *